J. H. COPE.
POWER LIFT SWEEP RAKE.
APPLICATION FILED MAY 18, 1911.
1,117,334.
Patented Nov. 17, 1914.
4 SHEETS—SHEET 1.
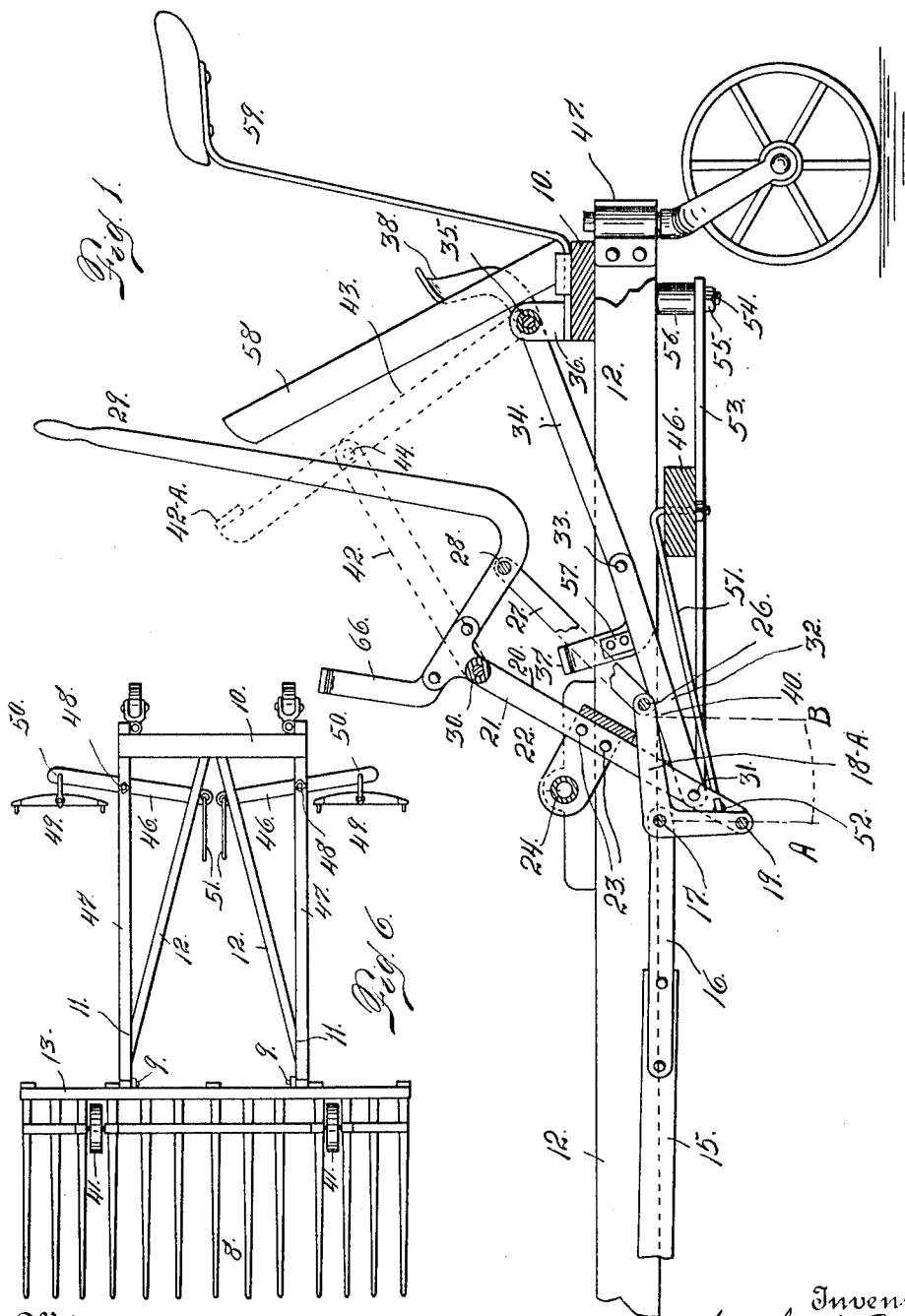

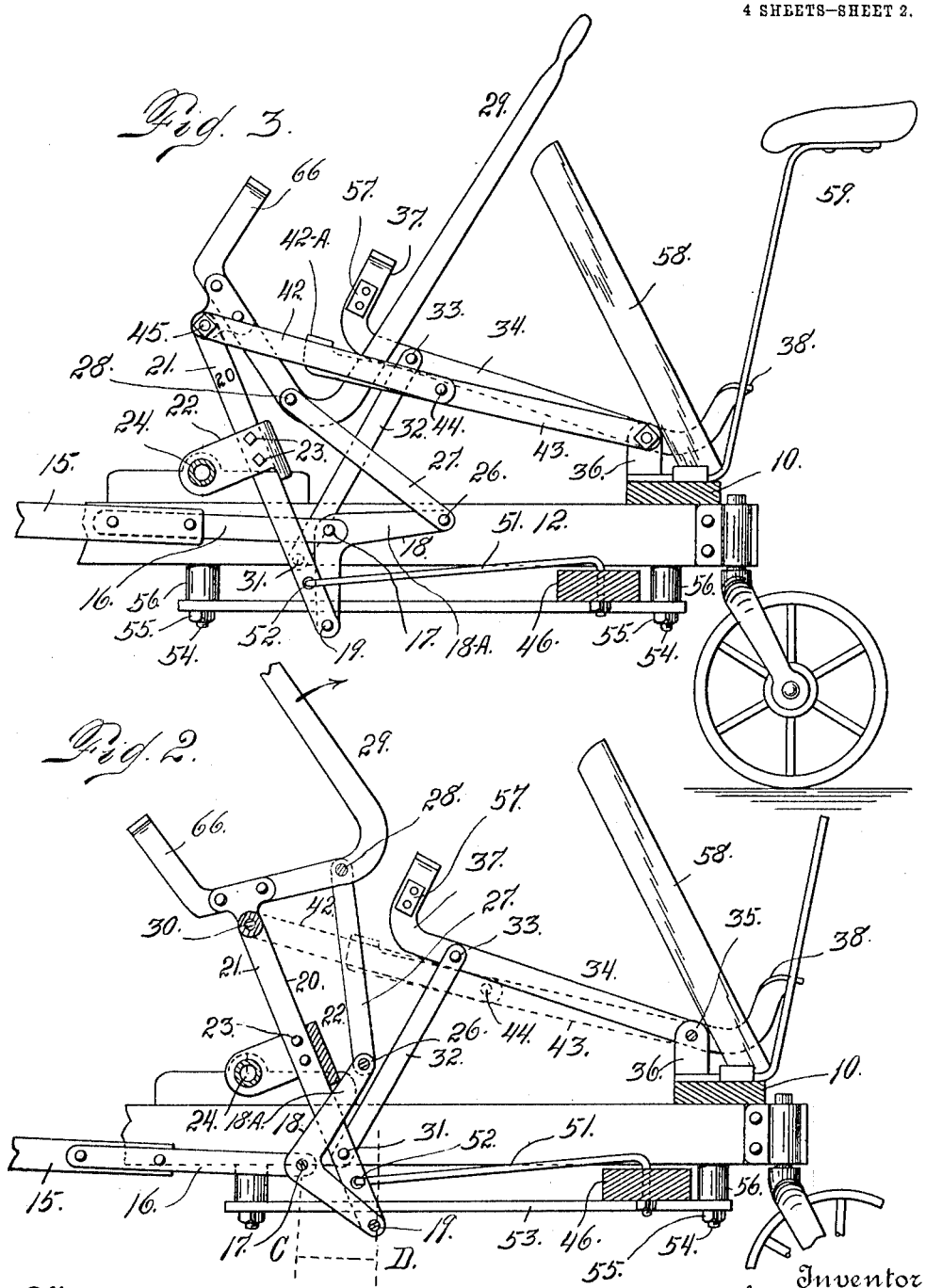

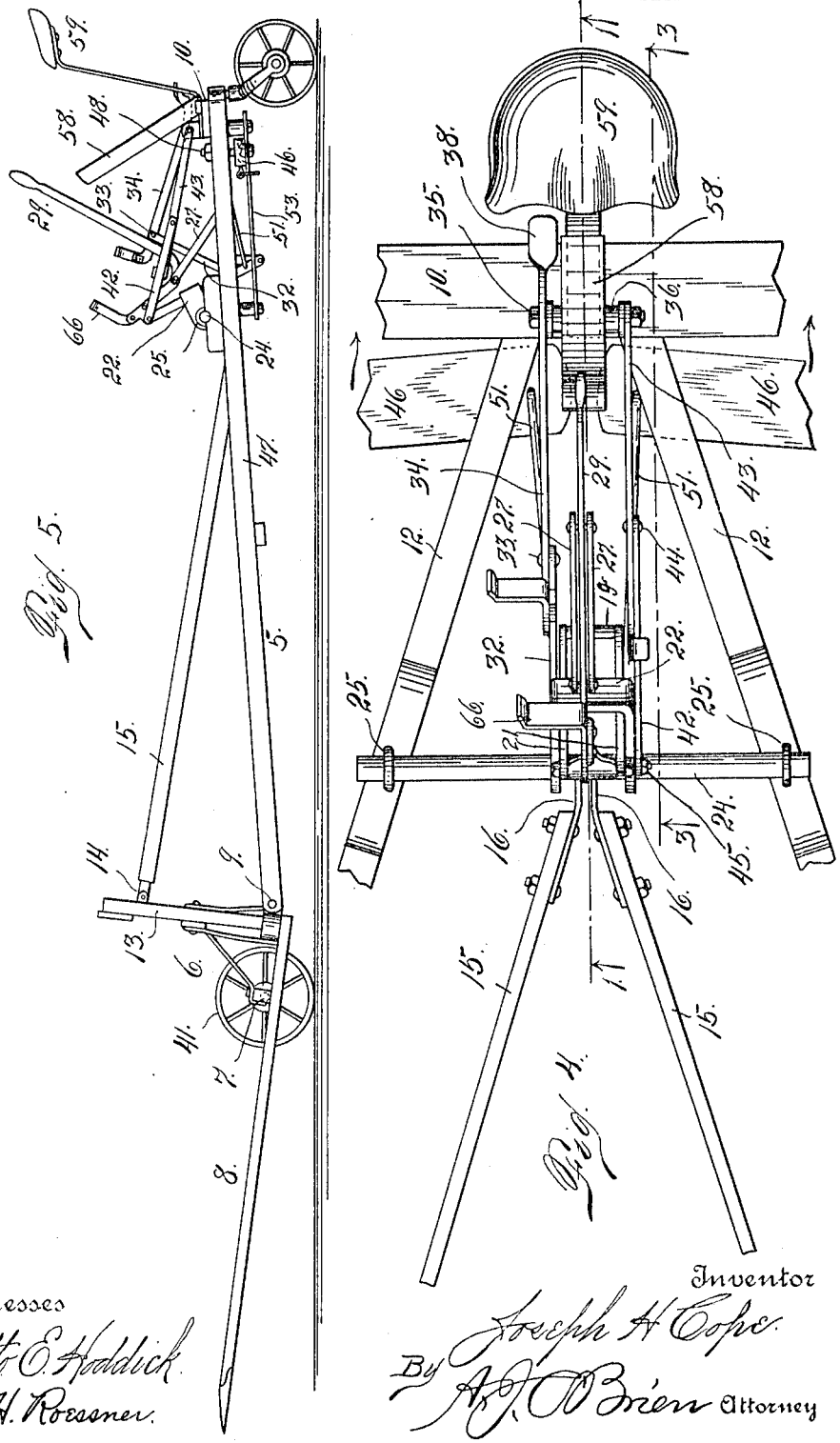

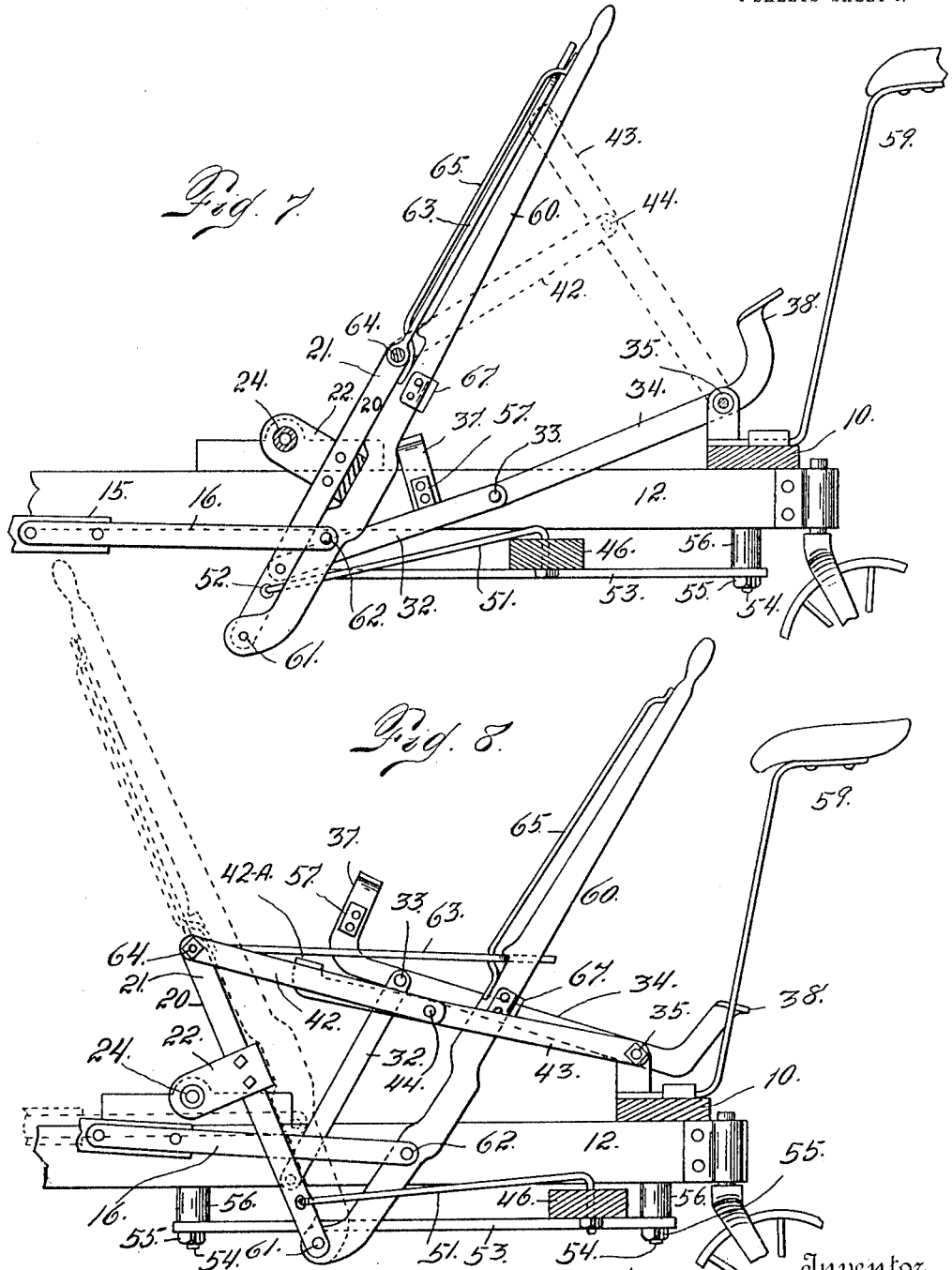

UNITED STATES PATENT OFFICE.

JOSEPH H. COPE, OF WINDSOR, COLORADO.

POWER-LIFT SWEEP-RAKE.

1,117,334.  Specification of Letters Patent.  Patented Nov. 17, 1914.

Application filed May 18, 1911. Serial No. 627,990.

*To all whom it may concern:*

Be it known that I, JOSEPH H. COPE, a citizen of the United States, residing at Windsor, in the county of Weld and State of Colorado, have invented certain new and useful Improvements in Power-Lift Sweep-Rakes; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in means for lifting the head of a sweep rake with the load thereon, or tilting the same upwardly on the forward axle as a pivot, whereby the teeth of the rake shall be raised a suitable distance above the ground to prevent obstruction after the rake is loaded and while traveling to the stack.

In my improved construction provision is made for accomplishing this adjustment by the movement of a single lever within a comparatively limited space, and the mechanism is of such peculiar construction that when the lever is moved in one direction the rake head is tilted upwardly a predetermined distance, while when the same lever is moved in the reverse direction the rake head is given an additional upward tilt, thus raising it to the limit of upward movement necessary for the aforesaid purpose.

My improved construction includes a pivoted bar, which, when the rake head is at its downward limit of movement, may be locked against turning on its pivot by virtue of a pair of pivoted links connected to form a sort of toggle joint, the said links being adjustable to occupy a position which will lock the pivoted bar against turning. However, by breaking this dead center position of the links, the said bar may be given a limited turning movement on its pivot whereby, by virtue of suitable connections with the rake head, the latter may be tilted upwardly. During the aforesaid movement of the pivoted bar, whereby the pivot which connects the toggle links is thrown considerably out of line with the pivots passing through the extremities of the links, a similar toggle link structure, connected with the pivoted bar on the opposite side of the pivot from the first named toggle link structure, is thrown into such position as to lock the pivoted bar against further movement. In this event a hand lever which is pivotally connected with the said bar at one extremity thereof, is given a reverse movement, and by virtue of suitable connections between the said lever and the upright member of the rake head, the latter is given a farther tilting action, thus raising the teeth of the head to the desired position above the ground. Provision is also made for connecting the said pivoted bar with the draft levers to which the power for moving the machine is applied, whereby by releasing the pivoted bar from the locking action of the first named pair of toggle links, the pull of the draft animals upon the said bars will of itself serve to impart the initial lifting action to the teeth of the rake head, after which the second or reverse movement of the hand lever will serve to complete the lifting action.

It will be understood that the entire adjustment or lifting action of the rake head may be accomplished by hand if the machine is still, but by starting the team employed in hauling the machine across the field the first step in the lifting operation may be entirely accomplished without manual aid.

Having briefly outlined my improved construction I will proceed to describe the same in detail, reference being made to the accompanying drawing in which is illustrated an embodiment thereof. In this drawing:

Figure 1 is a sectional elevation of my improved mechanism applied to a sweep rake, the rake structure being for the most part broken away. This is a section taken on the line 1—1, Fig. 4. Fig. 2 is a similar view with parts broken away, showing the elements, however, in different relative positions, being the position which they occupy after the initial lifting operation of the rake head has been accomplished. Fig. 3 is a similar view showing the parts in still another position, being that which they occupy after the final lifting operation of the rake head has been accomplished by the reverse or rearward movement of the hand lever. Fig. 4 is a top-plan view of the construction shown in Figs. 1 to 3, inclusive, and on approximately the same scale, the parts being in the same position as in Fig. 3. Fig. 5 is a side elevation illustrating my improved power lift mechanism applied to a sweep rake, the parts being shown on a smaller scale. Fig. 6 is a top-plan view illustrating the framework of the structure, the power lift mechanism being omitted with the exception of the rods which connect the draft bars therewith. Fig. 7 is a view similar to Fig. 1 showing a modified form of construction. Fig. 8 is a view showing a modified form of construction in positions corresponding to those illustrated in Figs. 2 and 3. When the hand lever is in the dotted line position in Fig. 8, the positions of the other parts common to both constructions will be as in Fig. 2, while when the position of the lever is in the full line position in Fig. 8, the said common parts will be in the same position as in Fig. 3.

The same reference characters indicate the same parts in all the views.

Let the numeral 5 designate the framework of a sweep rake, and 6 the head thereof pivotally mounted on an axle 7, whereby the head may be tilted to throw the teeth 8 either up or down forward of the axle, as may be desired, depending upon whether the machine is employed in collecting the material or whether it has been loaded and the head is adjusted for traveling to the stack with its load. The forward extremity of the frame 5 is pivotally connected with the head, as shown at 9. The frame consists of a rearwardly located cross beam 10 and forwardly extending bars 12 whose rear extremities are rigidly connected with the cross beam 10. These bars 12 diverge from each other as they extend forwardly, their forward extremities being considerably separated where they are connected with the side bars 47 as shown at 11.

Pivotally connected with the upright member 13 of the rake head as shown at 14 are two rods 15 whose forward extremities are considerably separated and whose rear extremities are quite close together and equipped with rearwardly extending metal straps 16 whose rear extremities are pivotally connected, as shown at 17, with an angle lever 18 fulcrumed, as shown at 19, on the lower extremity of a bar 20 composed of two members 21 which straddle the angle lever and pass through a stirrup-shaped bracket 22 to which the said members are rigidly secured, as shown at 23, the bracket being pivoted on a hollow spindle 24 whose extremities are anchored, as shown at 25, on the frame bars 12. The extremity of the lever 18 remote from its fulcrum 19 is pivotally connected as shown at 26 with the lower extremities of two links 27 which straddle the lever, and whose upper extremities are pivotally connected, as shown at 28, with a hand lever 29 which is fulcrumed, as shown at 30, on the upper extremity of the bar 20.

Pivotally connected, as shown at 31, with the bar 20 below its pivot 24 is a link 32 whose opposite extremity is pivotally connected as shown at 33 with a link 34, the latter being further pivoted as shown at 35 on a lug 36 mounted on the rearwardly located beam 10. This link 34 has an upturned member 37 extending forward of the pivot 33, and a rearwardly extending upturned member 38 located rearward of its pivot 35. These members 37 and 38 are for convenience of manipulation, the foot of the person in charge of the machine being employed for tripping the links. When these links are in the position shown in Fig. 1, whereby the center of their connecting pivot 33 is slightly below the centers of the pivots 31 and 35, the bar 20 is locked against movement on its spindle 24, since the toggle links 32 and 34 are in such position that their connecting pivot 33 will not move upwardly in response to an application of power on either extremity of the bar 20. When, however, this dead center position is changed by bending the links, as, by lifting on the forward extremity 37 of the link 34 or pressing downwardly on the rear extremity 38 of the same link, the pivoted bar 20 may be turned on the spindle 24 of its bracket 22, whereby the position of the angle lever 18 is changed from that illustrated in Fig. 1 to that disclosed in Fig. 2, and whereby the pivot 17 which connects the rear extremities of the rods 15 with the angle lever 18, is moved rearwardly from the point shown in Fig. 1 to a point 40 in the same figure, or a distance equal to the space between the dotted lines A and B in Fig. 1, thus imparting a corresponding tilting movement to the head 6 of the rake, since the rearward travel of the pivot pin 17 of the angle lever causes a corresponding travel of the rods 15 and a consequent pull in the rearward direction on the upright member 13 of the rake head 6, whereby the teeth of the rake are tilted upwardly by virtue of the fact that the head of the rake is journaled on the axle 7 supported by the forwardly located wheels 41 of the structure.

Attention is called to the fact that during the movement of the parts of the mechanism from the position shown in Fig. 1 to that shown in Fig. 2, the relative position of the pivoted bar 20, the angle lever 18, the link 27 and the hand lever 29 do not change to each other, since they all move together, the only parts that change position during such movement being the toggle links 32 and 34 and a small pair of toggle links 42 and 43 pivotally connected as shown at 44, the link 42 being pivoted at its extremity remote from its companion link on the pivot 45 forming the fulcrum for the hand lever 29; while the link 43 is connected with the pivot 35 with which link 34 is also connected. In further explanation of this operation I will state that immediately before beginning the movement of the pivoted bar 20 from the position shown in Fig. 1 to that shown in Fig. 2, the pivoted links 42 and 43 are approximately in the position shown by dotted lines in Fig. 1, while the links 32 and 34 are in the position shown in the same figure, but before beginning the operation the links 32 and 33 are thrown from their dead center position in the manner heretofore explained, and as the links 32 and 34 gradually change from the position shown in Fig. 1 to that shown in Fig. 2, the links 42 and 43 gradually approach the dead center position indicated by dotted lines in Fig. 2, whereby the pivoted bar 20 is locked against movement around the axis of the hollow spindle 24. In further explanation of the reason that the parts 18, 20, 27 and 29 maintain the same relative position while passing from the position shown in Fig. 1 to that shown in Fig. 2, it may be stated that the angle lever 18 has its arm 18^A in engagement with the U-shaped bracket 22 during such movement of the pivoted bar, whereby the angle lever and its connections are prevented from changing the relative positions during such operation. Assuming now that the parts are in the position shown in Fig. 2, the head of the rake having been tilted to impart a partial lifting movement to the rake teeth, the farther upward movement of the rake teeth will be accomplished by moving the lever 29 rearwardly by turning it on its fulcrum 30, but as the pivoted bar 20 is locked against turning movement by virtue of the position of the links 42 and 43, the only parts that will change position during the said movement of the hand lever, will be the last named lever, the link 27 and the angle lever 18, and as the lever 29 is moved rearwardly by turning it on its fulcrum 30, the parts will be thrown to the position illustrated in Fig. 3, whereby the pivot 17 which connects the angle lever with the rods 15 leading to the upright member of the rake head, will be moved from the position shown in Fig. 2 rearwardly a distance approximately equal to the distance between the dotted lines C and D in Fig. 2, this movement being sufficient to complete the tilting action of the rake head whereby the teeth 8 are raised to their limit of movement for traveling after the load of hay or other material has been placed thereon.

From the foregoing description it is believed that the use and operation of my improved power lift for sweep rakes will be readily understood. I have already explained the manner of lifting the rake head from its lowermost elevation, or that employed in collecting the hay or other material from the ground, whereby the teeth are raised to the necessary elevation for traveling or carrying the load to the stack. It is evident that in returning the head from its raised to its lowermost position that the movements heretofore described will be reversed. That is to say, if we assume that the rake head is in the position illustrated in Fig. 5 and that the lifting mechanism is in position illustrated in Figs. 3 and 5, in order to lower the rake head the pivot 17 which connects the angle lever 18 with the rods 15 must be moved forwardly a distance equal to its rearward movement during the tilting action of the rake head, whereby the teeth are raised as heretofore explained; and this will be accomplished first by moving the hand lever from the position shown in Fig. 3 to that shown in Fig. 2, during which time the pivoted bar 20 maintains its same position, the lever 29 together with the link 27 and the angle lever 18 being the only parts of the mechanism which change their positions. At the end of the travel of the hand lever from the position shown in Fig. 3 to that shown in Fig. 2, the pivot pin 17, and consequently the rods 15, will be moved forwardly a distance approximately equal to the space between the dotted lines C and D, whereby the rake head will be tilted to impart a partial lowering movement to the rake teeth, which operation will be completed by moving the hand lever rearwardly to the position shown in Fig. 1, whereby the pivoted bar 20, the hand lever 29, the angle lever 18 and the link 27 maintain the same relative position, all of the said parts turning on the axis of the hollow spindle 24. However, before this can be accomplished the pivoted links 42 and 43 must be changed from the dead center position indicated by dotted lines in Fig. 2 to a position to release the pivoted bar 20. This can be accomplished by lifting upwardly on a laterally projecting lip 42^a formed on the forward extremity of the link 43 and adapted to engage the companion link 42 when the parts are in the dead center or locking position. The person in charge of the machine may accomplish this operation by placing his foot underneath the lip 42^a and raising the same sufficiently to break the locking relation between the said links and the bar 42, then, as the said bar, together with the connected parts heretofore explained, is turned around the axis of the hollow spindle 24, the links 42 and 43 will gradually move to the position indicated by dotted lines in Fig. 1, while the links 32 and 34 will gradually assume the dead center or locking position illustrated in Fig. 1. It will thus be observed that when the lifting mechanism has been adjusted to tilt the rake head 6 and raise the teeth 8 from the ground for traveling purposes, the said parts of the lifting mechanism will be locked in the adjusted position by virtue of the fact that the links 42 and 43 are in the dead center position, or in a position to prevent the lowering of the rake teeth, while when the said mechanism is in the position corresponding with that of the rake head when the teeth are in the lowermost position, the said parts are locked in their adjusted relation by virtue of the facts that the links 32 and 34 occupy the dead center position.

In further explanation of the construction it may be stated that when the machine is in use the draft animals are hitched to bars 46 which are pivoted between the points where the animals are hitched on each side of the machine, and the inner extremities of the said bars, whereby as power is applied to the bars there is a tendency to throw their inner extremities rearwardly. This is illustrated in Fig. 6 in which the bars 46 are pivotally connected with said bars 47 of the frame, as shown at 48, the horses, if two are employed, being each hitched to a singletree 49 connected with the outer extremities of the bars, as shown at 50. The inner extremities of these draft bars are connected by means of rods 51 with the bar 20 below the pivot of the latter, as shown at 52, one of the said rods being connected with each member of the bar. By virtue of this construction and arrangement, as soon as the pivoted bar 20 is released from the locking action of the pivoted links 32 and 34, when in the position shown in Fig. 1, the pull of the draft animals upon the bars 46 whereby the inner extremities of the said bars are caused to move rearwardly, will serve to operate the mechanism whereby the parts are changed from the position shown in Fig. 1 to that shown in Fig. 2, thus relieving the person in charge of the machine from performing the said operation manually. These draft bars 46 are supported upon plates 53 secured to the frame bars 47 and located a sufficient distance below the said bars to allow the draft bars sufficient space to move freely on the plates 53. As illustrated in the drawing, the plates 53 are suspended from the frame bars 47 by means of bolts 54 to which fastening nuts 55 are applied, spacing sleeves 56 being interposed between the frame bars 47 and the said plates, to prevent the possible binding of the draft bars between the plates and the frame bars. The togggle link 34 is provided at its forward extremity with a stop plate 57 and adapted to engage its companion link 32 to prevent further movement of the links after they have assumed the locking position, best illustrated in Fig. 1 of the drawing. The framework of the machine is provided with an upwardly projecting bar 58 located in front of the seat 59, and in the same plane with the hand lever 29. This bar forms a sort of guard to prevent the lever from moving too far rearwardly.

In the form of construction shown in Figs. 7 and 8, the bell crank shaped lever 18, the link 17 and the lever 29 are dispensed with and a single relatively long hand lever 60 takes the place of the three discarded parts. This lever 60 is fulcrumed at the lower extremity of the pivoted bar 20 as shown at 61. Above the fulcrum 61 and below the hollow spindle 24 on which the bar 20 is pivoted, the lever 60 is connected as shown at 62 with the forwardly extending metal straps 16, the latter being in turn connected with the rear extremities of the bars 15, whose forward extremities are connected with the rake head as heretofore fully explained. In other respects the modified form of construction is substantially the same as the form illustrated in the other views except that a link 63 is pivotally connected with the upper extremity of the bar 20 as shown at 64, but its opposite extremity is slidably connected with a metal loop 65 with which the lever 60 is provided. The function of this link 63 is to lock the lever 60 in its rearward position after the final lifting step has been given to the forwardly extending toothed member of the rake head.

The operation of the modified form of construction so far as its new features are concerned, is as follows: If we assume that the parts are in the position shown in Fig. 7, the toothed member of the rake head is in its lowermost position, now if we desire to raise the said toothed member, the links 32 and 34 are adjusted so that their pivot 33 is moved upwardly throwing the links out of the dead center position. Then as the lever 60 is moved forwardly it carries the pivoted bar 20 with it, since the lever engages the stirrup shaped bracket 22 of the said bar and the two parts must move in unison. During this movement the lever 60 does not turn on its fulcrum 61, but the pivot 24 of the bar 20 in reality becomes the fulcrum of the lever 60 whereby a rearward movement is imparted to the bars 15 connected with the rake head, and a lifting movement given to the toothed member of the said head. Now as soon as the lever 60 is in the dotted line position, the links 42 and 43 are in the dead center position locking the pivoted bar 20 against further movement. Then as the hand lever 60 is moved rearwardly to the full line position in Fig. 8, the bars 15 are given a farther rearward movement, since during the travel of the lever 60 rearwardly from the dotted line position to the full line position in Fig. 8, the said lever moves upon its true fulcrum 61, and as the metal straps 16 are connected with the lever 60 above the fulcrum 61 of the latter, an additional rearward pull must be given to the bars 15. Hence in this construction, I have an operating lever provided with two distinct fulcrums, one of which is utilized to impart a lifting movement to the forwardly extending toothed member of the rake head, when the lever 60 is moved in one direction; while the other fulcrum is utilized to impart an additional lifting movement to the rake head when the same lever is moved in the opposite direction.

In my improved construction, provision is made for allowing the rake head or the toothed member thereof, to rise and fall as circumstances may require, since the lever with which the bars 15 are connected is free to move rearwardly while the pivoted bar with which the draft levers are connected, is locked against rearward movement when the rake head is in its lowered position.

With my improved construction, the teeth are free to move upwardly in response to the encountering of a sudden rise in the surface over which it is passing, while at the same time the operator by the pressure of his foot may hold the rake head downwardly with sufficient pressure to answer all practicable purposes.

In the form of construction shown in Fig. 1 the pressure of the foot for the purpose of holding the rake head down is applied to an upwardly projecting arm 37 of the lever 34, while in the form of construction shown in Figs. 7 and 8 the lever 60 is provided with a foot plate 67 conveniently located for receiving the foot of the person sitting upon the seat 59 of the rake.

It will be seen that in both modifications of my invention, I have virtually employed a form of compound lever. In the modification illustrated in Figs. 1 to 5, inclusive, the member 18 may be termed the main member and the part 20 the auxiliary member of the compound lever, while in Figs. 7 and 8, the part 60 constitutes the main member and the part 20 the auxiliary member.

Having thus described my invention, what I claim is:

1. The combination with a sweep rake having a head mounted to rock on a wheel-supported axle, whereby the teeth may be raised and lowered, the said head having an upright member and a forwardly extending toothed member, of means connected with the upright member for rocking the head on the said axle, comprising rods extending rearwardly from the upright member of the head, a bar pivoted intermediate its extremities, a lever connected with said rods and with the pivoted bar on one side of the pivot, a hand lever pivotally connected with said bar on the opposite side of the pivot, a link connection between the first named lever and the hand lever, and two pairs of toggle links respectively connected at one of their ends with the pivoted bar on opposite sides of its pivot and at their other ends with a portion of the frame, for locking said bar against movement when in two predetermined positions.

2. The combination with a sweep rake having a head mounted on a wheel-supported axle whereby the teeth may be raised and lowered, the said head having an upright member and a forwardly extending toothed member, of means connected with the upright member for rocking the said head on the said axle, comprising rods extending rearwardly from the said upright member of the head, a bar pivoted intermediate its extremities, a lever connected with said rods and with the pivoted bar on one side of the pivot, and means connected with the said lever and with said pivoted bar for actuating the latter to produce a rearward pull on the upright member of the rake whereby the toothed member of the said rake is raised, substantially as described.

3. The combination with a sweep rake having a head pivotally mounted, said head comprising an upright member and a toothed member, of means connected with the upright member for rocking the said head, said means comprising rearwardly extending rods connected with the upright member, a bar pivoted intermediate its extremities, a lever connected with said rods and with the pivoted bar on one side of the pivot, and means connected with the pivoted bar on the opposite side of the pivot for producing a rearward pull on the upright member of the rake head through the medium of the said lever, substantially as described.

4. The combination with a sweep rake having a head mounted to rock on a suitable support, the said head having an upright member and a forwardly extending toothed member, of means connected with the upright member for rocking the said head, said means comprising rods extending rearwardly from the said upright member of the head, a bar pivoted intermediate its extremities, a lever connected with the said rods and with the pivoted bar on one side of its pivot, and means for actuating the pivoted bar to impart a rocking movement to the rake head whereby the teeth are lifted through the medium of said lever, substantially as described.

5. The combination with a sweep rake having a head mounted to rock on a wheel-supported axle, said head comprising an upright member and a toothed member, of means connected with the upright member for rocking the head on its axle, said means comprising rods extending rearwardly from the said upright member of the head, a bar pivoted intermediate its extremities, a lever connected with the said rods and with the pivoted bar on one side of the pivot, a hand lever pivotally connected with the said bar on the opposite side of the pivot, and a link connection between the two levers, substantially as described.

6. The combination with a sweep rake having a head mounted to rock upon a suitable support, the said head having an upright member and a forwardly extending toothed member, of means for rocking the said head upon its support to raise the teeth of the head, said means comprising a pivoted bar, a lever connected with the said bar on one side of its pivot, an operative connection between the said member and the upright member of the rake head, and means connected with the pivoted bar and with the said lever for actuating the said bar to impart a rocking movement to the rake head, substantially as described.

7. The combination with a sweep rake having a head composed of an upright member and a forwardly extending toothed member, the said head being mounted on a pivoted support, of means for raising the toothed member of the head by imparting a rearward movement to the upright member, said means comprising a bar pivoted intermediate its extremities, a lever connected with said bar on one side of the pivot, an operative connection between the said lever and the upright member of the rake head, and means connected with said pivoted bar on the opposite side of the pivot thereof and with the said lever for actuating the said bar whereby the upright member of the rake head is moved rearwardly, substantially as described.

8. The combination with a sweep rake having a head composed of an upright member and a forwardly extending toothed member, the said head being mounted to rock on a suitable support, of means for moving the upright member rearwardly for the purpose of raising the toothed member, comprising a pivoted bar, a lever fulcrumed on said bar on one side of its pivot, an operative connection between the said lever and the upright member of the rake head, means connected with said bar for actuating the bar to produce a rearward pull on the upright member of the rake head, and means connected with said lever and with the bar for imparting a further rearward pull to the upright member of the rake head while the pivoted bar remains stationary, substantially as described.

9. The combination with a sweep rake having a head composed of an upright member and a forwardly extending toothed member, of means for rocking the said head upon a suitable support comprising a pivoted bar, a lever connected with the said bar on one side of its pivot, an operative connection between said lever and the upright member of the rake head, a manually operated lever connected with the pivoted bar on the opposite side of its pivot from the first named lever, and a link connection between the two levers, substantially as described.

10. The combination with a sweep rake having a head mounted to rock on a wheel supported axle, the said head having an upright member and a forwardly extending toothed member, of means connected with the upright member of the head for rocking the said head upon the said axle, comprising rods extending rearwardly from the said upright member of the head, a bar pivoted intermediate its extremity, a lever connected with said rods and with the pivoted bar on one side of the said pivot, means for actuating said pivoted bar to produce a rearward pull on the upright member of the rake through the medium of said lever, said means comprising a manually operated lever having a link connection with the first named lever, substantially as described.

11. The combination with a sweep rake having a head composed of an upright member and a forwardly extending toothed member, the said head being mounted to rock on a suitable support, of mechanism for moving the upright member rearwardly for the purpose of raising the toothed member, said mechanism comprising a pivoted bar, a lever fulcrumed on said bar on one side of its pivot, an operative connection between the said lever and the upright member of the rake head, means connected with said bar and main frame for actuating the latter to produce a rearward pull on the upright member of the rake head, means for locking the pivoted bar against movement when in its actuated position, and means connected with said lever and with the bar actuating means for imparting a further rearward pull to the upright member of the rake head.

12. The combination with a sweep rake having a head composed of an upright member and a forwardly extending toothed member, the said head being mounted to rock on a suitable support, of means for moving the upright member rearwardly for the purpose of raising the toothed member, said means comprising a pivoted bar and a lever fulcrumed on said bar on one side of its pivot, an operative connection between the said lever and the upright member of the rake head, means connected with said lever and with the said bar for actuating the bar to produce a rearward pull upon the upright member of the rake head when the said means is moved in one direction, and a further rearward pull upon the same member of the rake head without moving the pivoted bar, when the said means is moved in the opposite direction.

13. The combination with a sweep rake having a head composed of an upright member and a forwardly extending toothed member, the said head being mounted to rock on a suitable support, of means for moving the upright member rearwardly for the purpose of raising the toothed member, said means comprising a pivoted bar, a lever fulcrumed on said bar on one side of its pivot, an operative connection between the said lever and the upright member of the rake head, means connected with the said lever and with the said bar for actuating the bar to produce a rearward pull upon the upright member of the rake head, when said means is moved in one direction, and a further rearward pull upon the same member of the rake head without moving the pivoted bar when the said means is moved in the opposite direction, and means for locking the pivoted bar against movement after the initial rearward pull on the upright member of the rake head.

14. The combination with a sweep rake having a head mounted to rock on a wheel-supported axle whereby the teeth may be raised and lowered, the said head having an upright member and a forwardly extending toothed member, of means connected with the upright member for rocking the head on the said axle, said means comprising rods extending rearwardly from the upright member of the head, a bar pivoted intermediate its extremities, means for locking said bar in the actuated position, a lever connected with said rods and with the pivoted bar on one side of the pivot, and means connected with said lever and with said pivoted bar for actuating the latter to produce a rearward pull on the upright member of the rake head whereby the toothed member of the said head is raised when the said means is moved in one direction, and for imparting a further rearward pull to the upright member of the rake head while the pivoted bar remains stationary, and the said means moved in the opposite direction.

15. The combination with a sweep rake having a head mounted on a pivoted support, the said head having an upright member and a forwardly extending toothed member, of means connected with the upright member for rocking the said head, said means comprising rods extending rearwardly from the said upright member of the head, a bar pivoted intermediate its extremities, a lever connected with said rods and with the pivoted bar on one side of the pivot, means connected with the said lever and with said pivoted bar for actuating the latter to produce a rearward pull on the upright member of the rake head whereby the toothed member of the said head is raised, when the said means is moved in one direction, and for imparting a further rearward pull to the upright member of the rake head while the pivoted bar remains stationary and the said means moved in the opposite direction, and means for locking the pivoted bar against movement after the initial pull has been imparted to the upright member of the rake head.

16. The combination with a sweep rake having a head composed of an upright member and a forwardly extending toothed member, the said head being mounted to rock on a suitable support, of means for moving the upright member rearwardly for the purpose of raising the toothed member, said means comprising a pivoted bar, draft bars suitably fulcrumed on the machine, an operative connection between the pivoted bar and the draft bars on the side of the fulcrum opposite that to which the power is applied to the draft bars, a lever fulcrumed on the pivoted bar on one side of its pivot, an operative connection between the said lever and the upright member of the rake head, and a hand lever connected with the pivot bar and also with the first named lever for actuating the latter in conjunction with the draft bars to produce a rearward pull on the upright member of the rake head, substantially as described.

17. The combination with a sweep rake having a head mounted to rock on a wheel-supported axle, said head including a toothed member extending forwardly of the axle, of means connected with the rake head for rocking the latter on its axle to lift the toothed member, said means comprising rods extending rearwardly from the rake head, a bar pivoted intermediate its extremities, a lever connected with the said rods and with the pivoted bar on one side of the pivot, a hand lever pivotally connected with the said bar on the opposite side of its pivot, and a link connection between the two levers substantially as described.

18. The combination with a sweep rake having a head provided with a forwardly extending toothed member, the head being mounted to rock on a suitable support, of means for lifting that portion of the toothed member which is forward of the support of the latter comprising a pivoted bar, a lever fulcrumed on said bar below the pivot of the bar, an operative connection between said lever and the toothed member of the rake head for lifting purposes, said connection being between the fulcrum of the lever and the pivot of the bar, means for locking said lever and bar together, when the lever is moved in one direction whereby a lifting movement is imparted to the toothed member of the rake head, means for locking the pivoted bar in the adjusted position whereby as the lever is moved in the opposite direction it turns on its fulcrum and imparts a further upward movement to the toothed member of the rake head substantially as described.

19. The combination with a sweep rake having a head provided with a forwardly extending toothed member, the head being mounted to rock on a suitable support, of means for lifting that portion of the toothed member which is forward of its support comprising a pivoted bar, a lever fulcrumed on the bar on one side of the pivot of the latter, an operative connection between the lever and the rake head for lifting purposes, pivoted draft members, an operative connection between the draft members and the pivoted bar, a projection upon the bar protruding into the path of the lever to limit the relative movement of the two when the lever is moved in one direction, whereby the bar and lever are moved together upon the pivot of the bar, while pressure upon the lever in the opposite direction will move only the lever upon its own pivot, the said lever being free to move rearwardly when the toothed member of the rake head is in its lowered position, thus making it practicable by forward pressure upon the lever, to hold the toothed member of the rake head in its lowered position substantially as described.

20. The combination with a sweep rake having a head provided with a forwardly extending toothed member, the head being mounted to rock on a suitable support, means for lifting that portion of the toothed member which is forward of the support of the latter, composed of a lever and a bar, the bar being pivoted on a stationary support, the lever being pivoted on the bar, an operative connection between the lever and the rake head for lifting purposes, pivoted draft members, an operative connection between the draft members and the bar, a portion of the bar being in position to be engaged by the lever when the latter is moved in one direction, whereby both the lever and bar move together in one direction on the pivot of the bar, while pressure upon the lever in the opposite direction will move only the said lever upon its own pivot, the lever being free to move rearwardly when the toothed member of the rake head is in its lowered position, substantially as described.

21. The combination with a frame of a sweep rake having a head provided with a forwardly extending toothed member, the head being mounted to rock on a suitable support, of means for lifting that portion of the toothed member which is forward of the support, comprising a lever, a connecting rod pivoted at one end to said lever at a point intermediate the extremities of the latter, and at the other end to said rake head, a bar pivoted upon the frame, a pivotal connection between the bar and lever near one end of the latter, the last named pivotal connection and that between the rod and lever being upon the same side of the pivotal connection of the bar with the frame, means for locking said lever and bar together so far as movement imparted to the lever upon the pivot of the bar in one direction is concerned, and means for locking said bar in the actuated position with relation to the frame, said bar and lever together, and said lever alone, thus being adapted to be alternately utilized to impart successive movements in the same direction to the toothed member of the rake head.

In testimony whereof I affix my signature in presence of two witnesses.

JOSEPH H. COPE.

Witnesses:
PHILLIP P. SINNER,
WM. J. THOENNER.

Copies of this patent may be obtained for five cents each, by addressing the "Commissioner of Patents, Washington, D. C."